United States Patent [19]
Vuylsteke et al.

[11] Patent Number: 5,467,404
[45] Date of Patent: Nov. 14, 1995

[54] METHOD AND APPARATUS FOR CONTRAST ENHANCEMENT

[75] Inventors: Pieter P. Vuylsteke, Mortsel; Emile P. Schoeters, Lier, both of Belgium

[73] Assignee: Agfa-Gevaert, Mortsel, Belgium

[21] Appl. No.: 924,095

[22] Filed: Aug. 3, 1992

[30] Foreign Application Priority Data

Aug. 14, 1991 [EP] European Pat. Off. ............ 91202079

[51] Int. Cl.$^6$ ..................................................... G06K 9/40
[52] U.S. Cl. .......................... 382/274; 382/128; 382/299; 364/413.19
[58] Field of Search ............... 382/6, 54; 358/169; 364/413.18, 413.19; 324/309; 348/678

[56] References Cited

U.S. PATENT DOCUMENTS

| | | | |
|---|---|---|---|
| 4,229,764 | 10/1980 | Danos | 358/160 |
| 4,315,318 | 2/1982 | Kato et al. | 382/54 |
| 4,335,427 | 6/1982 | Hunt et al. | 364/414 |
| 4,740,896 | 4/1988 | Horiba et al. | 382/54 |
| 5,144,686 | 9/1992 | Yumiba: Takashi et al. | 382/54 |

*Primary Examiner*—Leo H. Boudreau
*Assistant Examiner*—Chris Kelley
*Attorney, Agent, or Firm*—Richard J. Birch

[57] ABSTRACT

A method and apparatus are disclosed for enhancing the contrast of a digital image by
a) decomposing said original image into a sequence of detail images or into an array of coefficients representing detail strength at multiple resolution levels and a residual image,
b) modifying each pixel of each detail image or each detail coefficient according to at least one non-linear monotonically increasing odd conversion function,
c) constructing said processed image by accumulating detail obtained from said modified detail images or from said detail coefficients, and further adding said residual image.

6 Claims, 15 Drawing Sheets

| 0.0025 | 0.0125 | 0.02 | 0.0125 | 0.0025 |
| --- | --- | --- | --- | --- |
| 0.0125 | 0.0625 | 0.1 | 0.0625 | 0.0125 |
| 0.02 | 0.1 | 0.16 | 0.1 | 0.02 |
| 0.0125 | 0.0625 | 0.1 | 0.0625 | 0.0125 |
| 0.0025 | 0.0125 | 0.02 | 0.0125 | 0.0025 |

FIG. 4c

Power function p=0.7

Composite power function $p_1 = 2$  $p_2 = 0.7$  $c = 0.01m$

METHOD AND APPARATUS FOR CONTRAST ENHANCEMENT

FIELD OF THE INVENTION

This invention relates to an image contrast enhancement method and to an apparatus for enhancing the contrast of a digital image. More in particular it relates to such method for use in a medical radiographic imaging system, such as a computed radiography system or a computed tomography system.

BACKGROUND OF THE INVENTION

In imaging systems where the final output image has to be evaluated by a human observer a problem arises when the original image as obtained from an image sensing device contains detail information at various degrees of coarseness, within a wide amplitude range. This situation may arise when the sensor has a good signal to noise ratio over a large dynamic range, which is the case with computed radiography or computed tomography. When a typical image captured by such a device, e.g. a computed radiography image of a knee is to be represented on a film hardcopy (to be viewed on a lightbox) or even worse, on a display screen, then contrast of anatomic detail must always be traded of against dynamic range. Given the limited dynamic range of the image output medium (smaller than 500:1 in case of a transparent film, and smaller than 100:1 in case of a CRT screen under normal viewing conditions) then the tradeoff can be stated extremely as follows:

i) if the entire dynamic range of the diagnostically meaningful signal levels is mapped onto the available output medium dynamic range, then overall contrast will be very low, and for many subtle details, contrast will be below the perceptual threshold level, hence these will be missed by the observer.

ii) if at the other hand only a part of the original dynamic range is mapped onto the output medium dynamic range then all signal levels below this range will all be mapped onto the same (low) output level, and all original levels exceeding this range will be mapped onto the same (high) output level.

In that case only those image pixels having a level within the selected dynamic range will be presented with acceptable contrast, while the other pixels will have uniform brightness, and will show up with no contrast at all.

In image workstations connected to a computed radiography or computed tomography system the desired compromise between both extreme mappings is interactively selectable, a feature which is commonly referred to as window/level setting.

However in common working environments such as a hospital there is no time for selecting the optimal window/level compromise, so the question is very urgent to display a single image on film or monitor screen, which reveals all the relevant diagnostic details with an acceptable contrast over the whole dynamic range.

This problem is largely recognized in the field of digital radiology, see: Maack I., Neitzel U., "Optimized Image Processing for Routine Digital Radiography", Proceedings International Symposium CAR '91, p. 109, Springer Verlag.

A similar problem exists in the area of photofinishing and prepress, where images obtained from wide latitude films or scanning systems have to be printed on paper with good contrast across the whole density range, despite of the much smaller latitude of the reproduction medium.

Many attempts have been made to achieve this goal, such as the commonly known technique of unsharp masking, adaptive histogram equalisation, and the many variants on these generic methods, but all suffer to some extent from the shortcoming that ghost details, called artifacts are created in the vicinity of significant signal level transitions, which occur e.g. at bone/soft tissue boundaries within the image. These artifacts cause a serious problem since they might suggest pathological evidence in a normal radiograph, or in other cases such artifacts might hide subtle lesions. The detrimental effect of these artifacts on diagnosis are well described in literature: Rehm K., Dallas W. J., "Artifact Suppression in Digital Chest Radiographs Enhanced With Adaptive Histogram Equalization", Proceedings of SPIE, vol. 1092 Medical Imaging III, pp. 294–296, 1989, International Society for Optical Engineering, Bellingham; Oestmann J. W., Prokop M., Schaefer C. M., Galanski M., "Artefacts in Digital Storage Phospor Radiography", Proceedings International Symposium CAR '91, pp. 125, Springer Verlag; Bick U., Wiesmann W., Lenzen H., Fiebich M., von Lengerke H.-J., Peters P. E., "Utilizing digital luminescence radiography in pediatric radiology: a report of initial experiences", Electromedica, vol. 59, no.1, p.30, 1991.

Another problem with these contrast enhancement methods, which are based on the use of a sliding local operator, relates to the choice of the operator size. If one chooses a small operator size, only a few pixels diameter, then only the smaller details will be enhanced. With a larger operator size, larger details will be enhanced, at the expense of suppressing details of a different scale, which might be important as well. Adapting the operator size to the specific radiologic examination case may sometimes be feasible, but in many cases diagnostic details occur at different scale levels within the same image (even within close vicinity), in which case the results remain unsatisfactory despite fine tuning attempts. The multiple experimental studies on optimal parameter tuning for unsharp masking confirm that this is a non-trivial problem: Prokop M., Schaefer C., Oestmann J. W., Meschede A., Reichelt S., Galanski M., "Optimal Parameters for Unsharp Mask Filtering in Digital Chest Radiographs", Proceedings International Symposium CAR '91, pp. 149–154, Springer Verlag; Prokop M., Galanski M., Oestmann J. W., von Falkenhausen U., Rosenthal H., Reimer P., Nischelsky J., Reichelt S., "Storage Phosphor versus Screen-Film Radiography: Effect of Varying Exposure Parameters and Unsharp Mask Filtering on the Detectability of Cortical Bone Defects", Radiology vol. 177, no. 1, pp. 109–113, Oct. 1990.

In the field of digital image processing a novel paradigm of multiresolution computation has evolved the last decade, sometimes called pyramidal image processing. According to this concept multiple sets of processing parameters are used, tuned to a wide range of detail sizes. The basic concepts and efficient implementations of pyramidal decomposition are described in: Burr P. J., "Fast Filter Transforms for Image Processing", Computer Graphics and Image Processing, vol. 16, pp. 20–51, 1981; Crowley J. L., Stern R. M., "Fast Computation of the Difference of Low-Pass Transform", IEEE Trans. on Pattern Analysis and Machine Intelligence, vol. 6, no. 2, March 1984.

Alternative multiresolution representations are presented in: Mallat S. G., "A Theory for Multi resolution Signal Decomposition: The Wavelet Representation", IEEE Trans. on Pattern Analysis and Machine Intelligence, vol. 11, no. 7, July 1989; Ebrahimi T., Kunt M., "Image compression by Gabor Expansion", Optical Engineering, vol. 30, no. 7, pp. 873–880, July 1991.

Until now the main purpose of this kind of image processing techniques has been directed towards image compression: Arbeiter J. H., "Multi-dimensional video image processing architecture", Optical Engineering, vol. 25, no. 7, pp. 875–880, July 1986; Adelson E. H., Simoncelli E., and Hingorani R., "Orthogonal pyramid transforms for image coding", Proceedings of SPIE, vol. 845, pp. 50–58, 1987, International Society for Optical Engineering, Bellingham.

Other applications include multiresolution image segmentation, image interpolation, and filter synthesis with specified frequency response: Lifshitz L. M., Pizer S. N., "A Multiresolution Hierarchical Approach to Image Segmentation Based on Intensity Extrema", IEEE Trans. on Pattern Analysis and Machine Intelligence, vol. 12, no. 6, pp. 529–540, June 1990; Szeliski R., "Fast Surface Interpolation Using Hierarchical Basis Functions", IEEE Trans. on Pattern Analysis and Machine Intelligence, vol. 12, no. 6, pp. 513–528. June 1990; Ranganath S., "Image Filtering Using Multiresolution Representations", IEEE Trans. on Pattern Analysis and Machine Intelligence, vol. 13, no. 5, pp. 426–440, May 1991.

OBJECT OF THE INVENTION

It is a principal object of the present invention to provide a method for improving contrast of a digital image over the whole range of signal levels without enlarging the dynamic range.

Another object of the present invention is to provide a method for reducing the dynamic range without lowering the contrast of low amplitude details, so that the whole range of signal levels may be visualised on a display or recorded on a recording film with acceptable contrast.

Another object of the present invention is to provide a method for enhancing contrast without preference for a specific detail size range. A further object of the present invention is to provide a method for enhancing contrast without creating artifacts in the neighborhood of significant image transitions, typical of methods related to unsharp masking or adaptive histogram equalisation.

A still further object of the present invention is to provide a method for enhancing contrast without remarkably boosting the noise component. A still further object of the present invention is to provide a method for enhancing contrast with increased sharpness.

A still further object of the present invention is to provide an apparatus for enhancing contrast with the above mentioned features.

SUMMARY OF THE INVENTION

We have found that the above objectives can be met by applying a method of enhancing the contrast of an image represented by an array of pixel values by processing said image, said processing comprising the steps of
a) decomposing said original image into a sequence of detail images at multiple resolution levels and a residual image at a resolution level lower than the minimum of said multiple resolution levels,
b) modifying the pixel values of said detail images to yield pixel values of a set of modified detail images according to at least one non-linear monotonically increasing odd conversion function with a slope that gradually decreases with increasing argument values,
c) computing said processed image by applying a reconstruction algorithm to the residual image and the modified detail images, the reconstruction algorithm being such that if it were applied to the residual image and the detail images without modification, then said original image or a close approximation thereof would be obtained.

The decomposition is performed so that each pixel value in said original image is equal to the sum of the corresponding pixel value of said residual image incremented by the corresponding pixel value of each of said detail images, said residual and detail images being brought into register with the original image by proper interpolation if their number of pixels is not equal to the number of pixels of the original image, and so that
i) the mean of all pixel values in every detail image is zero;
ii) the spatial frequency of every detail image is limited to a specific frequency band, said frequency band being defined as the compact region in the spatial frequency domain which contains nearly all (say 90%) of the spectral energy of the basic frequency period of said discrete detail image, adjusted to the original spatial frequency scale if said detail image contains less pixels than said original image;
iii) every detail image corresponds to a different spatial frequency band, in such a way that the entire spatial frequency domain ranging from −pi to pi radians per pixel along both spatial frequency axes is covered by said spatial frequency bands associated with all said detail images considered within the decomposition;
iv) each spatial frequency band associated with one of said detail images may partially overlap the neighboring bands without being fully included by a frequency band associated with another detail image;
v) the number of pixels within each detail image is at least the number of pixels required by the Nyquist sampling criterion, so as to avoid aliasing,
vi) at least two of said spatial frequency bands are considered in the course of said decomposition.

The processed image is computed as the pixelwise sum of all modified detail images incremented by the corresponding pixel value in the residual image, said residual and detail images being brought into register with the original image by proper interpolation if their number of pixels is not equal to the number of pixels of the original image.

The objects of the present invention can further be met by an alternative embodiment of the processing method of the present invention comprising the steps of
a) decomposing said original image into a weighted sum of predetermined basic detail images at multiple resolution levels and a residual basic image by applying a transform to said image, said transform yielding a set of detail coefficients each expressing the relative contribution to the original image of one of a set of basis functions representing said basic detail images and a residual coefficient representing the relative contribution to the original image of a basis function representing said basic residual image, whereby said basis functions are continuous and non-periodic and have zero mean value except for the basis function that represents the basic residual image, and wherein said transform is characterised in that there exists an inverse transform which returns the original image or a close approximation thereof when being applied to said transform coefficients,
b) modifying the detail coefficients according to at least one non-linear monotonically increasing odd mapping having a slope that gradually decreases with increasing absolute argument values, said function yielding a set of modified transform coefficients,
c) computing said processed image by applying said inverse transform to the modified detail coefficients and the residual coefficient.

According to this embodiment the decomposition is such that the value of each pixel within said original image is equal to the sum of all corresponding pixel values in said basic detail images multiplied by the associated detail coefficient, said sum further incremented by the corresponding pixel value of said basic residual image multiplied by the associated residual coefficient, and wherein the decomposition is such that if the complete set of said predetermined basic detail images would be partitioned into subsets of basic detail images with identically sized spatial extent, said spatial extent being defined as the compact pixel domain which contains all the signal energy of said basic detail images, all pixels outside said compact domain having zero value, then said partitioned set of predetermined basic detail images would be such that:

i) the mean of all pixel values of every said basic detail image is zero;
ii) every said subset covers the entire domain of said original image, i.e. for every pixel within said original domain there is within every said subset at least one basic detail image the spatial extent of which overlaps with said pixel;
iii) all said basic detail images belonging to any particular subset are limited to the same spatial frequency band, said frequency band being defined as the compact region in spatial frequency domain which contains nearly all (say 90%) of the spectral energy of the basic frequency period of said basic detail image;
iv) every said subset corresponds to a different spatial frequency band, in such a way that the entire spatial frequency band ranging from −pi through pi radians/pixel along both spatial frequency axes is covered by said spatial frequency bands associated with all said subsets considered within the decomposition;
v) each spatial frequency band associated with one of said subsets may partially overlap the neighboring bands, without being fully included by a frequency band associated with another said subset;
vi) at least two and preferably more said spatial frequency bands are considered in the course of said decomposition.

The present invention further discloses a processing apparatus for performing the contrast enhancing method(s) according to the present invention on an electronic image representation. The processed image can be visualised by hardcopy recording or through display on a monitor.

The electronic image representation is generally obtained by an acquisition apparatus or acquisition section. Then, in the processing section said image representation is decomposed into detail images at multiple resolution levels and a residual image at still lower resolution, these detail images are modified and a processed image is computed by means of a reconstruction algorithm. Next the processed image can be applied to an output section or output apparatus.

The acquisition section can be any apparatus or part thereof for obtaining an electronic representation of an image. For application in the medical field the acquisition unit can be an apparatus wherein an electronic representation of a image is obtained directly such as a medical scanner, a tomography apparatus, an image intensifier, etc. or alternatively an apparatus wherein an electronic representation of an image is obtained through the intermediary of a storage device such as a radiographic film or a photostimulable phosphor screen.

The output section can be a hard-copy recording apparatus such as a laser printer or a thermal printer etc. or it can be a visual display apparatus such as a monitor.

The image processing method of the present invention has been developed for the purpose of improving contrast of a digital image over the whole range of signal levels without enlarging the dynamic range in a system for reproducing or displaying an image read-out of a photostimulable phosphor screen.

Additionally this method is very efficacious when used for improving contrast in radiotherapy.

Further details relating to the apparatus as well as to different embodiments of the contrast enhancing method are described hereinbelow with reference to the drawings wherein FIG. 1 is a block scheme generally illustrating an apparatus according to the present invention, FIG. 2 is specific embodiment of an image acquisition apparatus, FIG. 3 is a block scheme illustrating the different steps of the contrast enhancing method, FIG. 4a illustrates one way of performing the decomposition step in a method according to the present invention, FIG. 4b illustrates an embodiment of a reconstruction algorithm, FIG. 4c shows the coefficients of an example of a Gaussian filter, FIG. 4d shows a modified embodiment of the reconstruction step, FIG. 4e shows another modified embodiment of the reconstruction step, FIG. 5a illustrates another embodiment of a decomposition step, FIG. 5b illustrates the corresponding reconstruction algorithm, FIG. 6a shows a one-dimensional plot of the squared modulus of the transfer functions of a series of low pass filters of decreasing bandwith along one of the spatial frequency coordinate axes, FIG. 6b shows the squared modulus of bandpass filter transfer functions corresponding to the subtraction of two low pass filter transfer functions at successively lower resolution.

Figure 1:
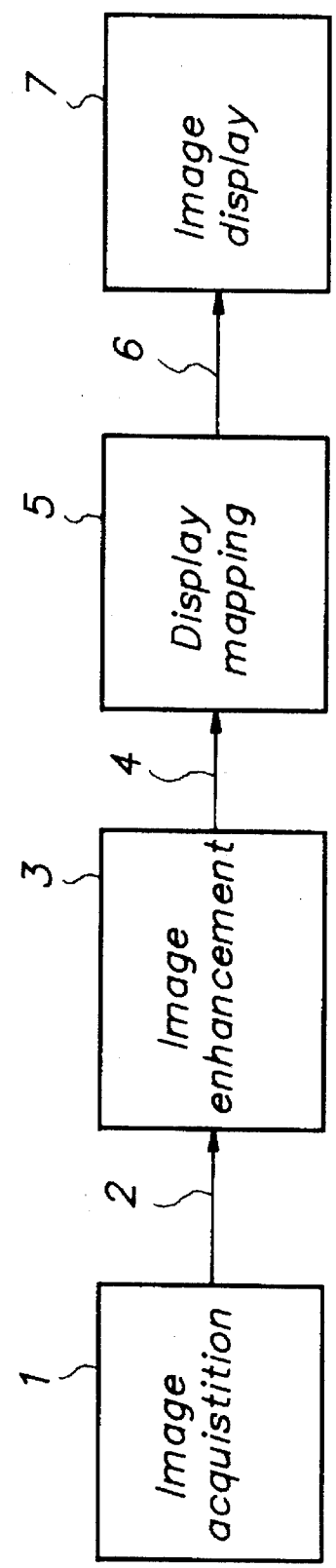

A simplified block diagram of an apparatus according to the present invention is shown in FIG. 1. An image acquisition unit 1 acquires a digital image by sampling the output signal of an image sensor, such as a CCD sensor, a video camera, or an image scanner, an image intensifying tube, quantizes it using an A/D convertor into an array of pixel values, called raw or original image 2, with pixel values typically 8 to 12 bits long, temporarily stores the pixel values in memory if desired, and transmits the digital image 2 to an image enhancement unit 3, where the image contrast is adaptively enhanced in accordance with the present invention, next the enhanced image 4 is transmitted to the display mapping section 5 which modifies the pixel values according to a contrast curve, such that the relevant image information is presented in an optimal way, when the processed image 6 is visualised on an image output device 7, which produces either a hardcopy on transparent film or on paper, or a viewable image on a display screen (CRT).

Figure 2:
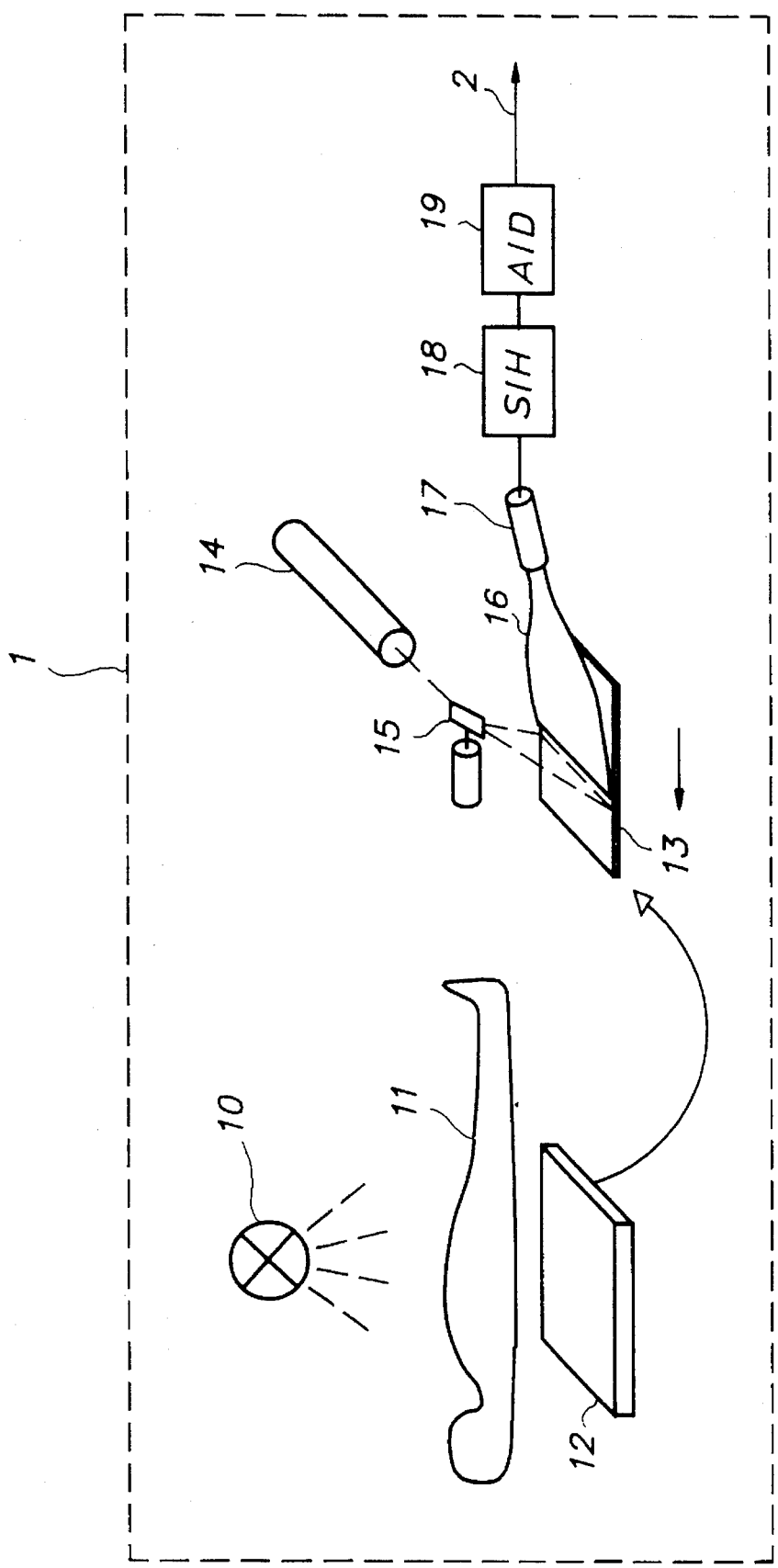

A preferred embodiment of image acquisition unit 1 is shown in FIG. 2. A radiation image of an object 11 or part thereof, e.g. a patient is recorded onto a photostimulable phosphor plate by exposing said plate to X-rays originating from an X-ray source 10, transmitted through the object. The photostimulable phosphor plate 13 is conveyed in a cassette 12. In a radiation image readout apparatus the latent image stored in the photostimulable phosphor plate is read out by scanning the phosphor sheet with stimulating rays emitted by a laser 14. The stimulating rays are deflected according to the main scanning direction by means of a galvanometric deflection device 15. The secondary scanning motion is performed by transporting the phosphor sheet in the direction perpendicular to the scanning direction. A light collector 16 directs the light obtained by stimulated emission onto a photomultiplier 17 where it is converted into an electrical signal, which is next sampled by a sample and hold circuit 18, and converted into a 12 bit digital signal by means of an analog to digital converter 19. From there the digital image 2, called raw or original image, is sent to the enhancement section 3.

Figure 3:
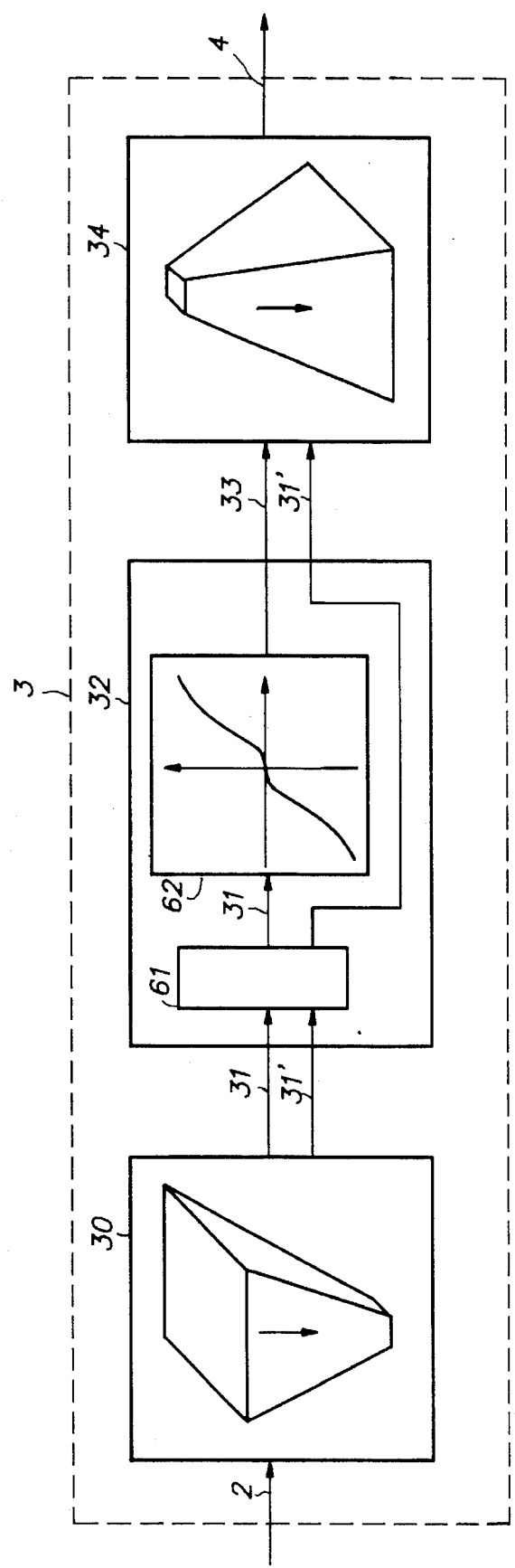

The image enhancement system 3 consists of three main parts, schematically drawn in FIG. 3. In a decomposition section 30 the original image 2 is decomposed into a sequence of detail images, which represent the amount of detail present in the original image at multiple resolution levels, from fine to coarse.

After the last decomposition step a residual image 31' may be left. The resulting detail images 31, which represent the amount of local detail at successive resolution levels are next modified in modification section 32 by means of a non-linear mapping operation.

In the image reconstruction section 34 the modified detail images 33 are next accumulated at all resolution levels, along with the residual image 31' to compute the enhanced image 4.

Figure 4A:
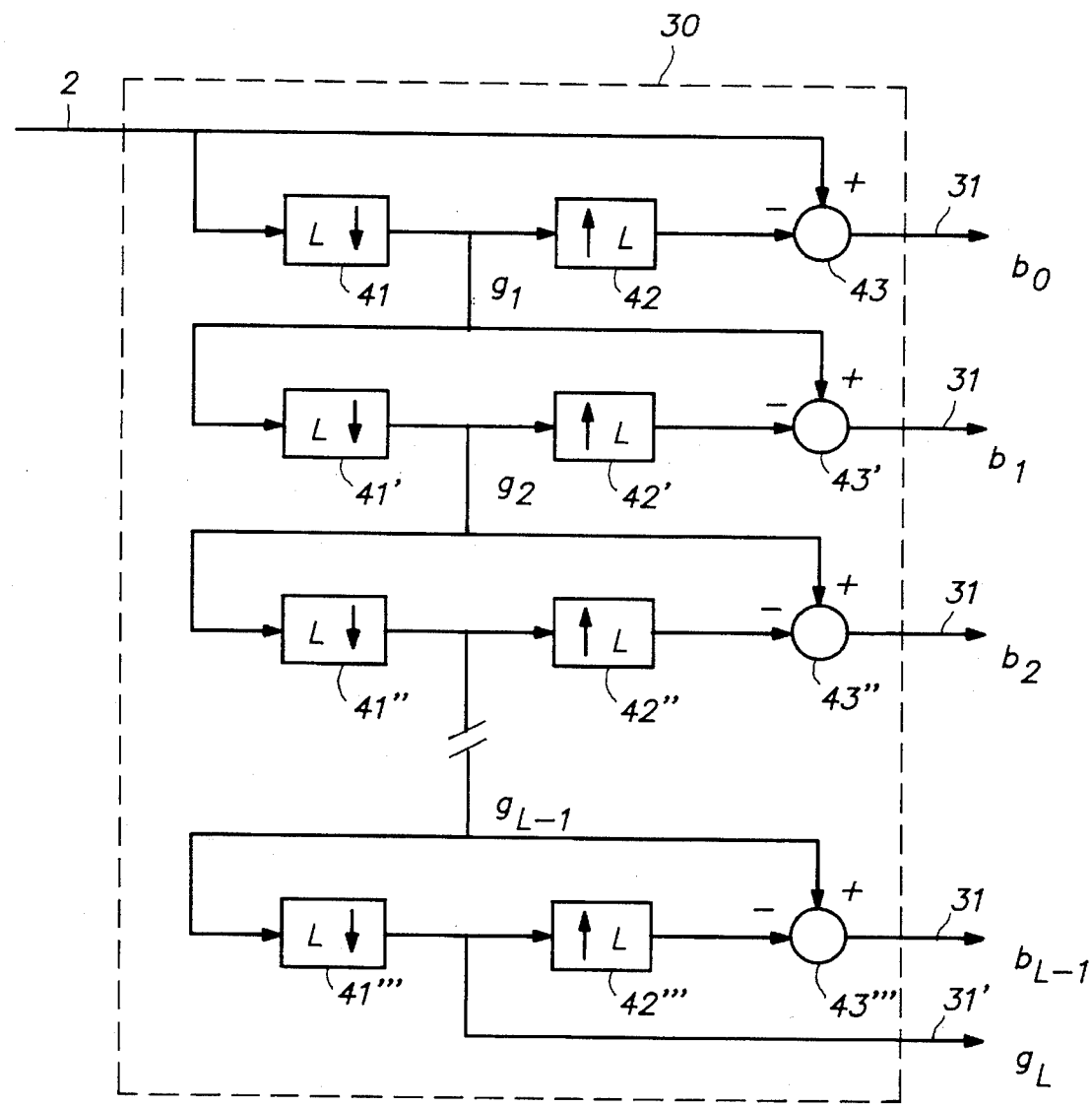

A preferred embodiment of the decomposition process is depicted in FIG. 4a. The original image is filtered by means of a low pass filter 41, and subsampled by a factor of two, which is implemented by computing the resulting low resolution approximation image $g_1$ only at every other pixel position of every alternate row.

A detail image $b_0$ at the finest level is obtained by interpolating the low resolution approximation $g_1$ with doubling of the number of rows and columns, and pixelwise subtracting the interpolated image from the original image 2. The interpolation is effectuated by the interpolator 42, which inserts a column of zero values every other column, and a row of zero values every other row respectively, and next convolves the extended image with a low pass filter. The subtraction is done by the adder 43.

The same process is repeated on the low resolution approximation $g_1$ instead of the original image 2, yielding an approximation of still lower resolution $g_2$ and a detail image $b_1$.

A sequence of detail images $b_i$, i=0 ... L−1 and a residual low resolution approximation $g_L$ are obtained by iterating the above process L times. The finest detail image $b_0$ has the same size as the original image. The next coarser detail image $b_1$ has only half as many rows and columns as the first detail image $b_0$. At each step of the iteration the maximal spatial frequency of the resulting detail image is only half that of the previous finer detail image, and also the number of columns and rows is halved, in accordance with the Nyquist criterion. After the last iteration a residual image $g_L$ 31' is left which can be considered to be a very low resolution approximation of the original image. In the extreme case it consists of only 1 pixel which represents the average value of the original image 2. The filter coefficients of the low pass filter of the preferred embodiment are presented in FIG. 4c. They correspond approximately to the samples of a two dimensional gaussian distribution on a 5×5 grid. The same filter coefficients are used for the low pass filters 41, 41', ... 41''' at all scales. The same filter kernel with all coefficients multiplied by 4 is also used within the interpolators 42, 42', ... 42'''. The factor of 4 compensates for the insertion of zero pixel columns and rows as explained above.

Figure 4B:
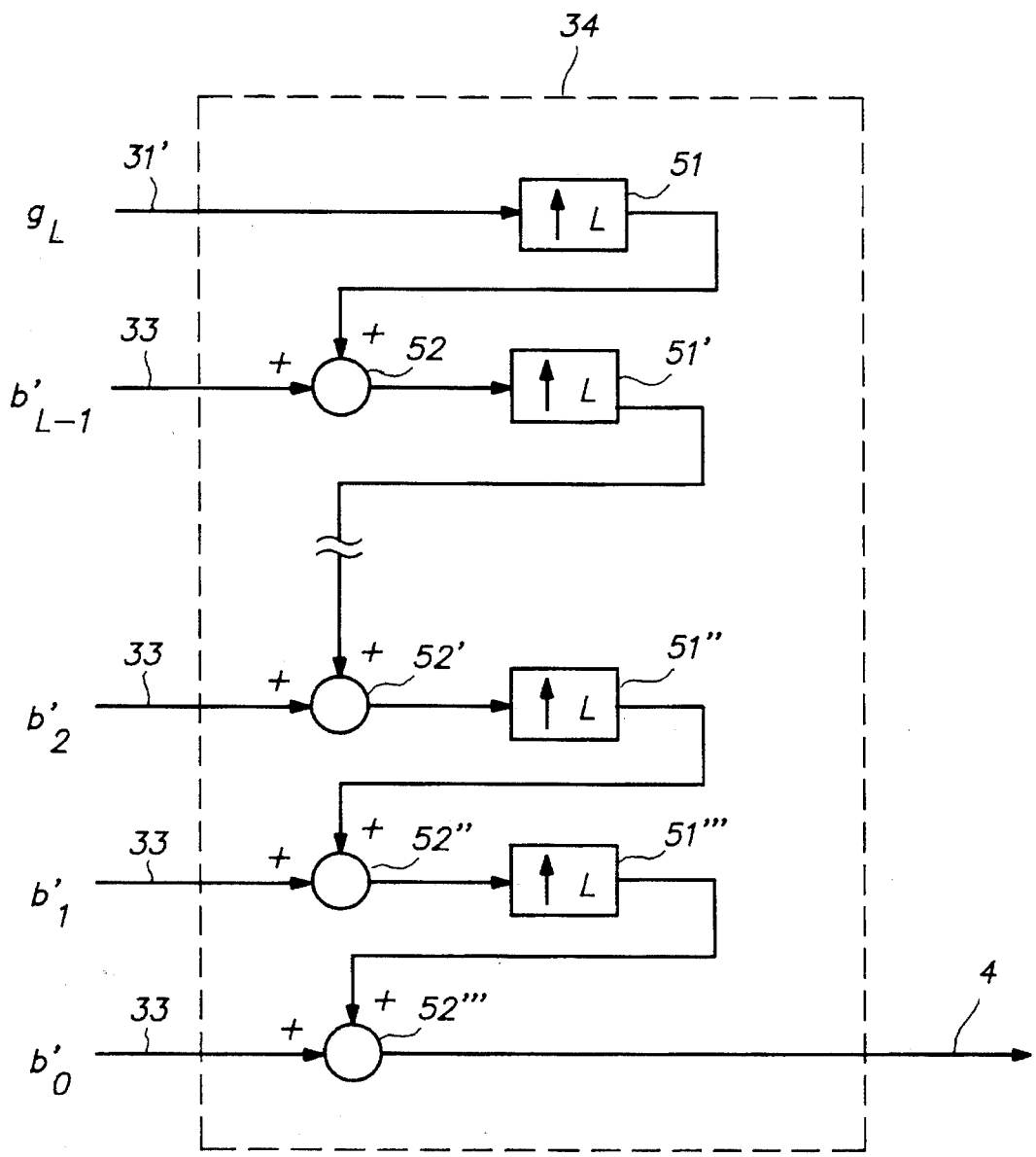

The corresponding reconstruction process is depicted in FIG. 4b. The residual image is first interpolated by interpolator 51 to twice its original size and the interpolated image is next pixelwise added to the detail image of the coarsest level $b'_{L-1}$, using adder 52. The resulting image is interpolated and added to the next finer detail image. If this process is iterated L times using the unmodified detail images $b_{L-1}$ ... $b_0$ then an image equal to the original image 2 will result. If at the other hand the detail images are modified before reconstruction according to the findings of the present invention, then a contrast enhanced image 4 will result. The interpolators 51, 51' ... 51''' are identical to those used in the decomposition section.

Further details of the above described decomposition and reconstruction methods, called hierarchical decomposition are given in: "Multiresolution Image Processing and Analysis", Ed. A. Rosenfeld, Springer Series in Information Sciences, Springer Verlag, pp. 10–14.

The image quality of the reproduction of a radiologic image read-out of a photostimulable phosphor screen can further be improved by boosting or suppressing the contribution of the detail information as a function of the average approximation values at a certain resolution level.

More specifically the contribution of the detail information is decreased in relatively bright image regions and enhanced in darker regions. This method provides that the disturbing effect of noise is diminished without reducing the overall sharpness impression of the image reproduction, for the noise perception in bright areas is in general more prominent in bright areas than in the darker regions of a radiograph. To achieve this goal the previously described embodiment is modified according to one of the next implementations.

Figure 4D:
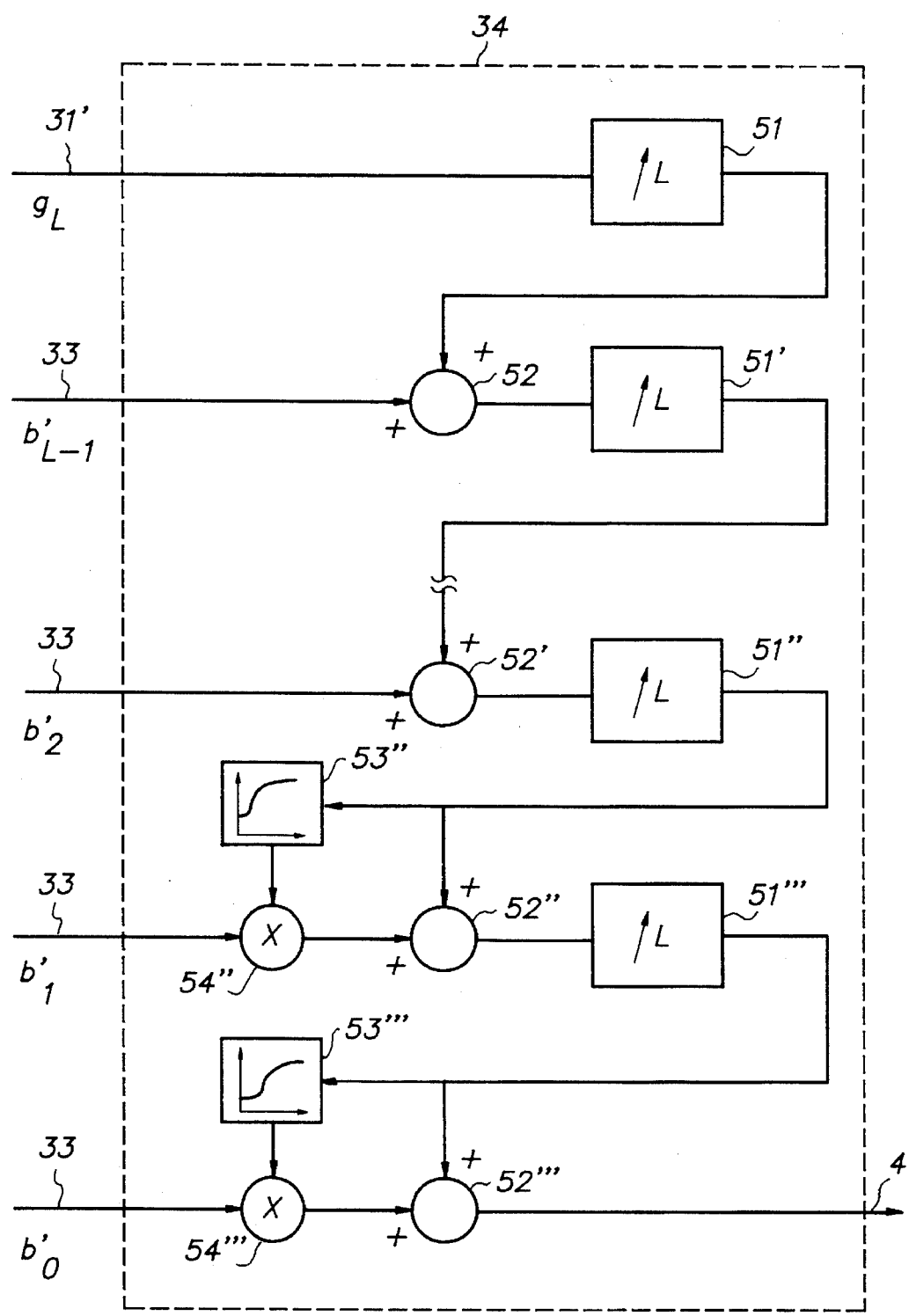

A first implementation of this procedure is illustrated in FIG. 4d. In the last (preferably two or three) stages of the reconstruction process the modified detail images $b'_i$ are pixelwise multiplied by a coefficient which is obtained by applying a lookup table 53'' ... 53''' to the corresponding pixels of the interpolated partially reconstructed image from the previous coarser resolution level. The mapping implemented by the lookup table 53'' ... 53''' is such that the resulting coefficient values are smaller than one in case of relatively small abscissae (corresponding to bright pixels in the partially reconstructed image), and larger than one for relatively large abscissae (corresponding to darker pixels). After multiplication by multipliers 54'' ... 54''' of the thus obtained coefficients with the pixels of the modified detail images $b'_i$ the resulting pixels are added to the pixels of the partially reconstructed at that stage the same way as described before. This process is repeated until an enhanced image 4 is obtained. In the illustration of FIG. 4d the method is applied only to the finest two resolution levels.

Figure 4E:
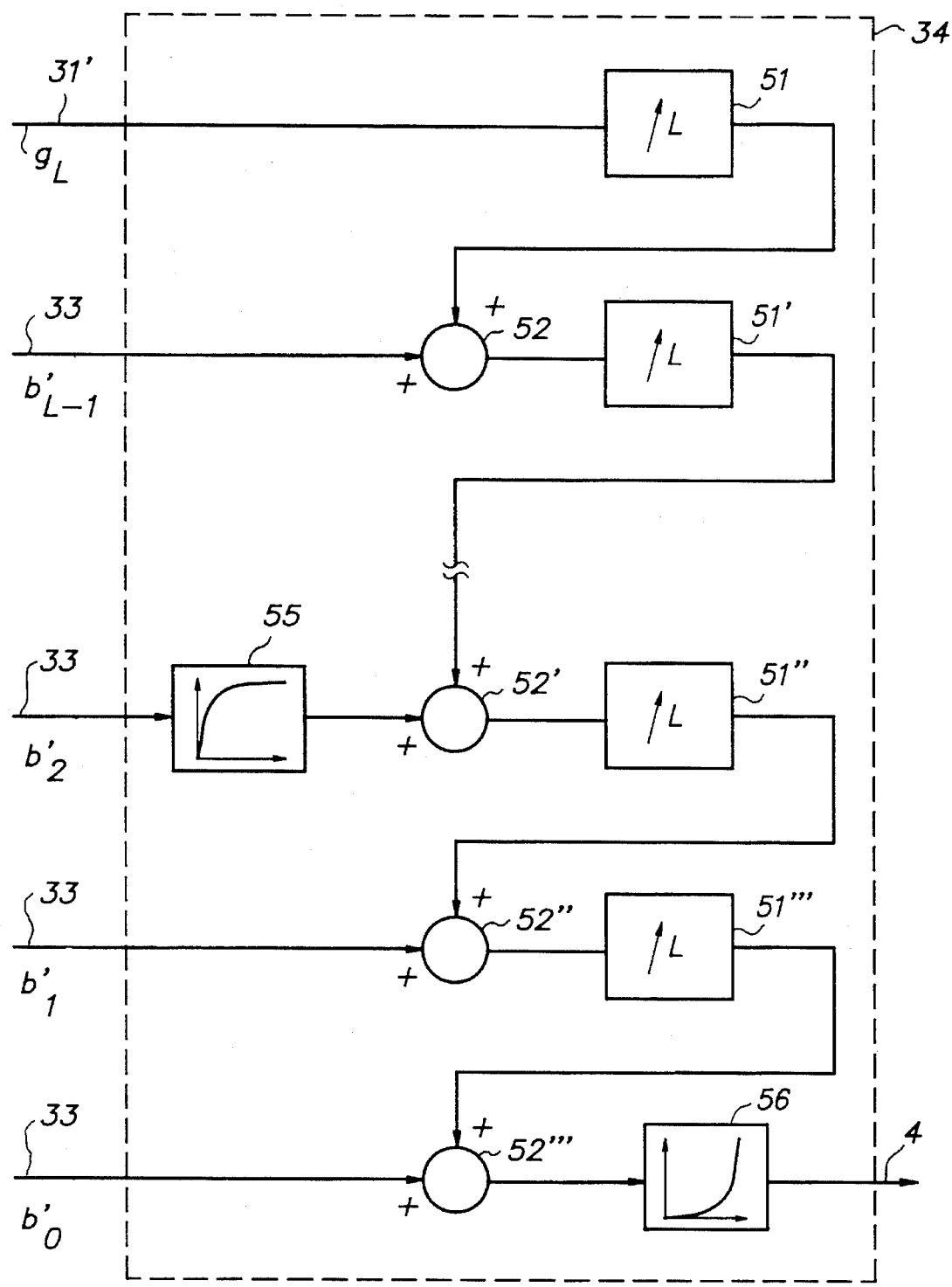

The invention further provides a second implementation of this brightness dependent contrast enhancement method that is preferred because of the reduced computational effort; this implementation is illustrated in FIG. 4e.

During the reconstruction process a partially reconstructed image at an intermediate resolution level, typically 2 or 3 octaves coarser than the resulting image, is converted according to a monotonically increasing conversion curve with gradually decreasing slope, for example a power function $y=x_{max}*(x/x_{max})^{p_0}$, $0<=x<=x_{max}$, with a power value $0<p_0<1$, typically $p_0=0.25$.

Next, the reconstruction procedure is continued by pixelwise addition of the detail image at the current resolution level, and interpolation to the image size of the next finer level. This is repeated until a full size reconstructed image is obtained the same way as described before. Finally the resulting image is converted according to a curve which is the inverse of the aformentioned conversion curve, for the given example this is the same kind of power function, with a power value $p_0=1/0.25=4$.

The nonlinear conversion of the partially reconstructed image followed by the inverse conversion after reconstruction, essentially modifies the relative importance of fine detail w.r.t. accumulated pixel value at the specified intermediate resolution level, as a function of said accumulated pixel value, which is representative of the brightness at the corresponding position in the final reconstructed image (since said intermediate image is a low resolution approximation of the final image). The inverse conversion guarantees that the overall gradation remains unchanged, i.e. the combined effect of forward and inverse conversion is nihil if the finer detail images added after forward conversion are all zero. As a result fine detail contrast (and also noise) in bright images areas are reduced w.r.t. detail contrast of similar amplitude in dark image regions.

In the method according to FIG. 4e the above forward conversion is applied to an approximation image after interpolation to the current image size; the same objectives are met if said forward conversion is applied to the approximation image before interpolation.

The above forward and inverse conversions are commonly implemented by means of a lookup table (55 and 56 resp.). The inverse lookup table may be merged with the lookup table that implements the mapping of signal values into density values to be obtained in the reproduction of a soft- or hardcopy, in order to reduce computation time.

Figure 5A:
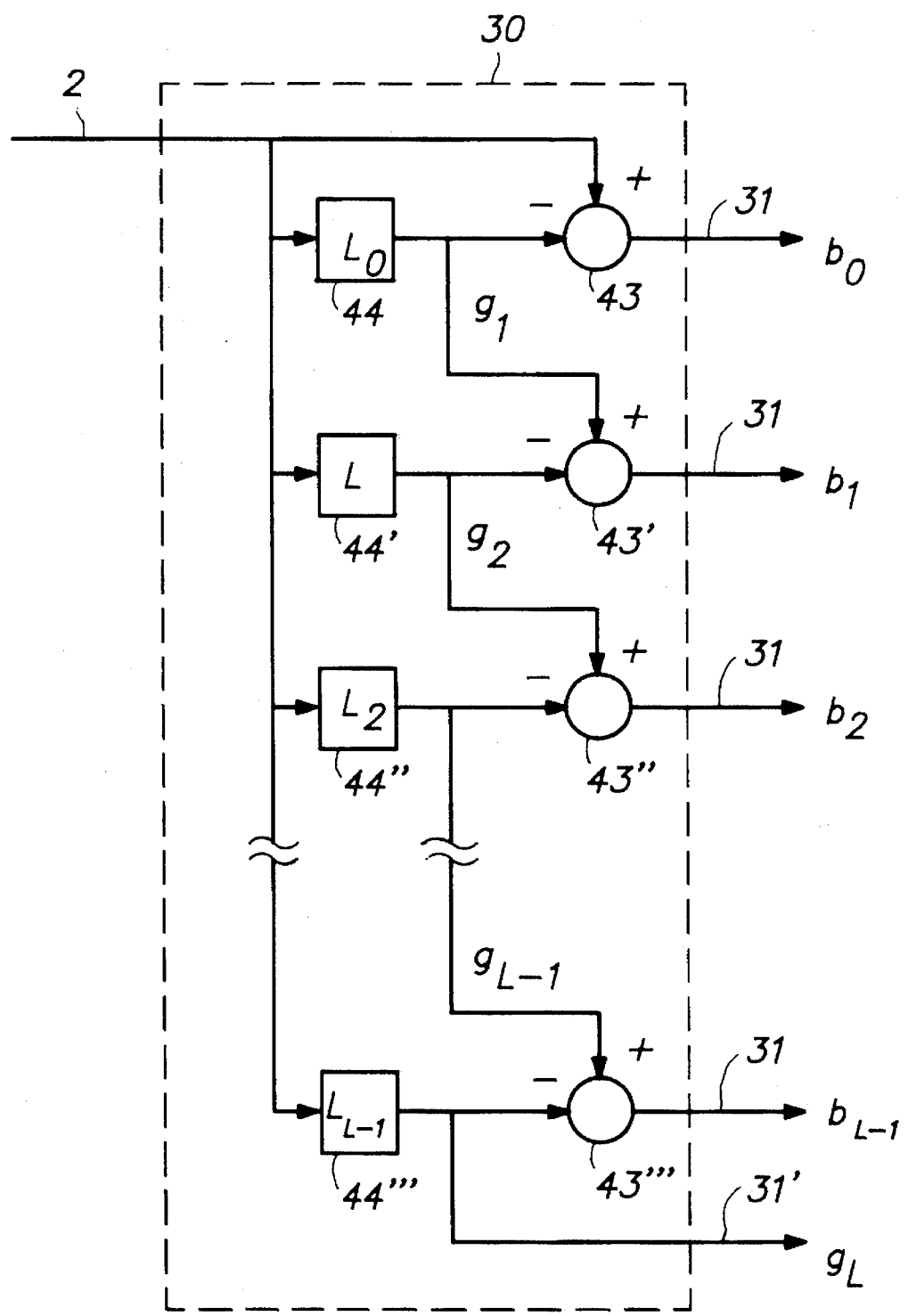
Figure 5B:
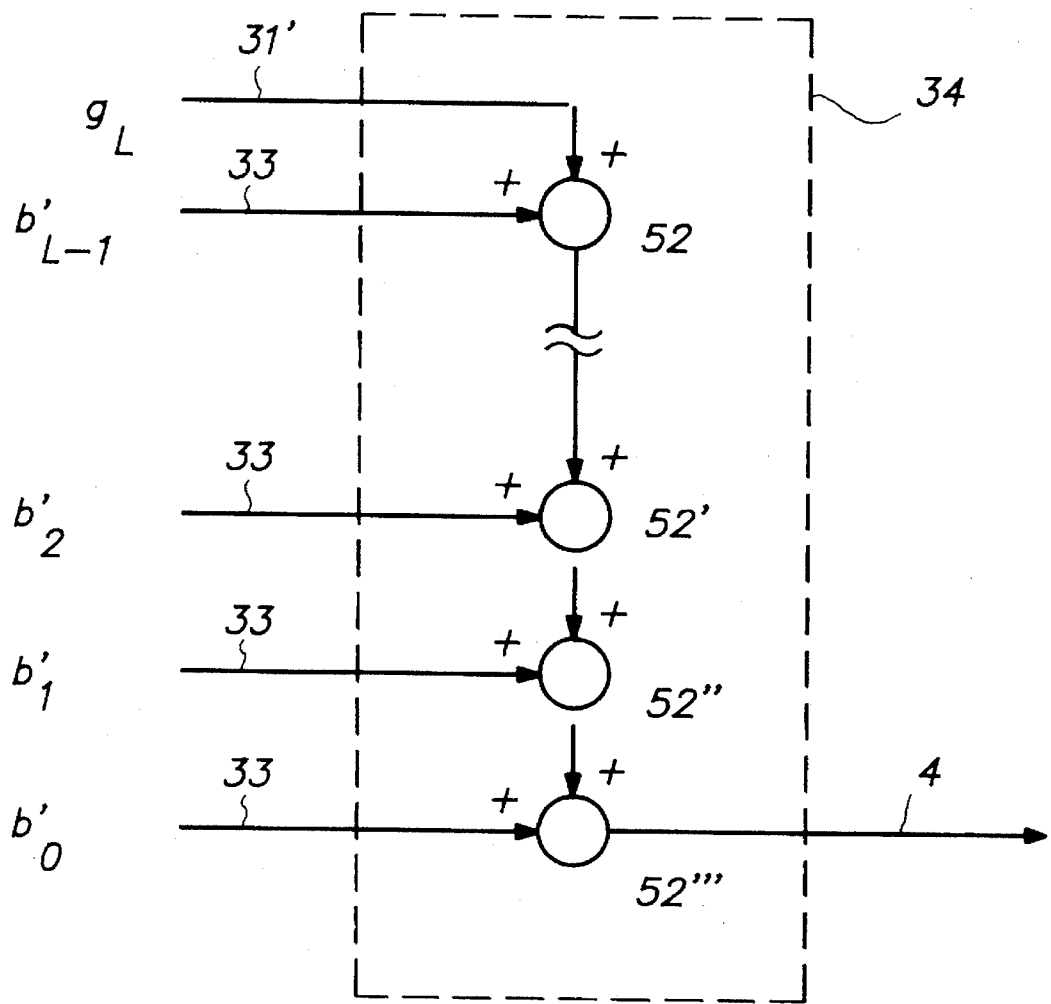

FIG. 5a and 5b depict a second embodiment of the decomposition process and the corresponding reconstruction process respectively. The original image is filtered by means of a low pass filter 44, yielding a low resolution approximation of the original image $g_1$. A detail image $b_0$ at the finest level is obtained by pixelwise subtracting the low resolution approximation $g_1$ from the original image.

The same process is repeated on the low resolution approximation $g_1$ instead of the original image 2, using a low pass filter 44', which has a smaller bandwidth than the low pass filter used within the first iteration. The result is an approximation of still lower resolution $g_2$, and a detail image $b_1$.

A sequence of detail images $b_i$, $i=0\ldots L-1$ and a residual low resolution approximation $g_L$ are obtained by iterating the above process L times, using low pass filters $L_i$ with decreasing bandwidth.

In a preferred embodiment the bandwidth is decreased by a factor of 2 at every iteration, but other factors can also be considered. A set of low pass filters $L_i$ with systematic bandwidth reduction of one octave is easily derived from the filter $L_0$ at the finest resolution level by successively doubling the number of rows and columns of the filter coefficient kernel, inserting a zero row every other row, and a zero column every other column, respectively. This implementation is computationally efficient, since all multiplications with zero coefficients and subsequent additions can be omitted.

The reconstruction according to this second preferred embodiment is depicted in FIG. 5b. The resulting image 4 is simply obtained by pixelwise adding all detail images $b'_i$, $i=0\ldots L-1$ to the residual image $g_L$. When this process is executed starting from the unmodified detail images $b_{L-1}\ldots b_0$ then the original image 2 will result. When at the other hand the detail images are modified before reconstruction according to the findings of the present invention, then a contrast enhanced image will result. The above embodiment is still characterised as multi resolution since the bandwidth is reduced at every subsequent decomposition stage, but it is not pyramidal, since the number of pixels is not reduced accordingly. However this issue does not affect the contrast enhancement performance. Each of the detail images $b_i$ as obtained by one of the decomposition methods described above represents the detail information contained in the original image at a specific scale, corresponding to a specific band in spatial frequency.

Figure 6A:
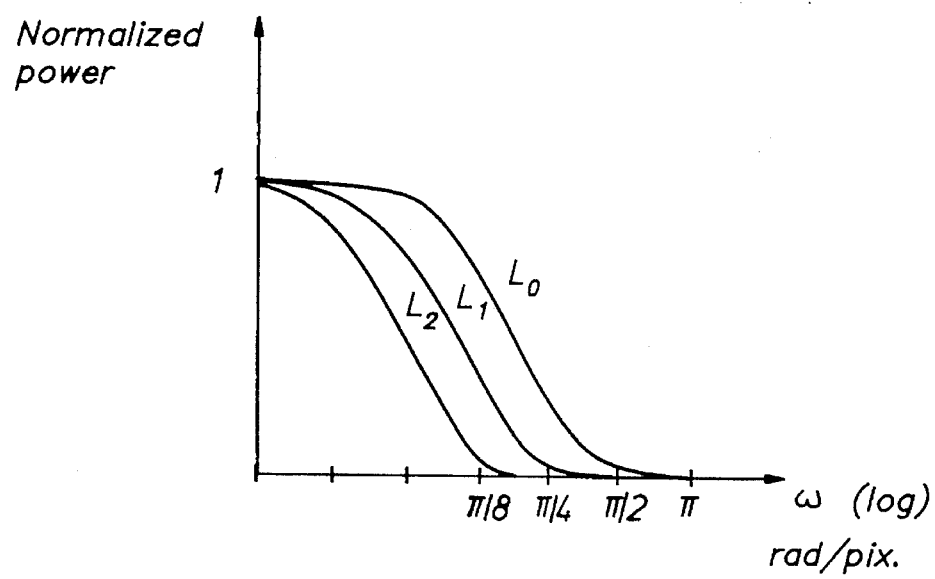
Figure 6B:
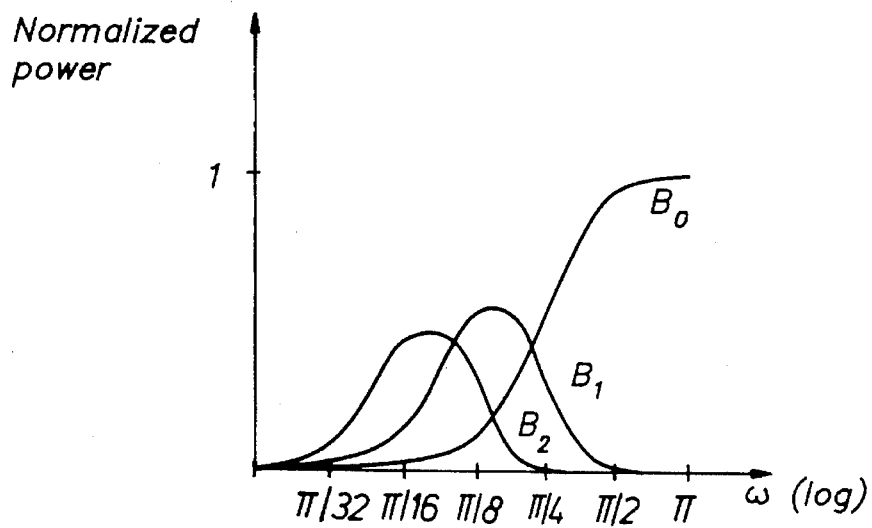

FIG. 6a shows a one-dimensional plot of the squared modulus of the transfer function of the lowpass filters $L_i$ along one of the spatial frequency coordinate axes. The cut-off frequency is halved for every subsequent filter. Other reduction factors, such as sqrt(2) may work as well, but the implementation is more complicated, especially if the number of pixels is reduced in accordance with the resolution reduction every subsequent stage. The squared modulus of the bandpass filter transfer functions corresponding to the subtraction of two lowpass filters at successively lower resolution is shown in FIG. 6b. Although the transfer functions substantially overlap, each of them clearly corresponds to a spatial frequency band.

A third embodiment of the decomposition and reconstruction process is as follows. The decomposition consists of finding a matrix of weighting coefficients such that the original image is approximated in the least squared error sense as the pixelwise sum of basis images, each basis image multiplied by the appropriate weighting coefficient. In a preferred embodiment the basis images are defined as the product of two one-dimensional basis functions along each of the coordinate axes: cfr. formula (1)

Each individual product cfr. formula (2) can be considered as a basis image, with pixel coordinates (k,l).

The least squared error solution matrix of weighting coefficients, corresponding to a predetermined set of basis functions is computed using the known technique of singular value decomposition. According to this technique the weighting coefficient matrix W can be expressed as a concatenated matrix product: cfr. formula (3).

The theory of singular value decomposition is described in: Wilkinson J. H,. Reinsch, "Handbook for automatic computation", vol. 2, Linear Algebra, Springer Verlag.

Algorithms for numerically efficient implementation of singular value decomposition are available from the NAG library, Numerical Analysis Group, Mayfield House, 256 Banburry Road, Oxford OX27BE, UK.

In a preferred embodiment according to the findings of the present invention, the set of basis functions $h_i$ must be choosen to represent local detail at all scales and at any position within the original image, such that every localised image detail contributes to only a few weighting coefficients $w(i,j)$. This means that the basis functions must have non-zero values only within a limited contiguous abscissa range, the size of this range depending upon the scale for which said basis function is representative. Hence periodic basis functions as used in the Fourier transform are not suited within the context of the present invention. Furthermore the basis functions must have smooth behaviour, to represent natural details, which excludes basis functions such as used in the Hadamard transform or the Haar transform.

A family of basis functions that very effectively represent detail in the context of the present invention are the so-called wavelets. A description of this category of functions is given in:

Maltat S. G., "A Theory for Multi resolution Signal Decomposition: The Wavelet Representation", IEEE Trans. on Pattern Analysis and Machine Intelligence, vol. 11, no. 7, July 1989.

For an image consisting of N×N pixels, $N=2^p$, N orthogonal wavelet basis functions can be found, so that H is an N×N orthogonal matrix, all singular values are non-zero, and the diagonal elements of the matrix D are finite.

In the latter preferred embodiment based on wavelet decomposition, the reconstruction is accomplished by successive matrix multiplication: cfr. formula 4.

When the reconstruction is executed starting from the unmodified detail weight coefficient matrix W then the original image 2 will result. When at the other hand the detail weight coefficients are modified before reconstruction according to the findings of the present invention, then a contrast enhanced image will result.

A still further embodiment of decomposition and reconstruction using orthogonal pyramidal basis functions according to the findings of the present invention is based on the use of quadrature mirror filters. This multi resolution decomposition technique is described in: Adelson E. H., Simoncelli E., and Hingorani R., "Orthogonal pyramid transforms for image coding", Proceedings of SPIE, vol. 845, pp. 50–58, 1987, International Society for Optical Engineering, Bellingham.

With the above described embodiments based on orthogonal decomposition exact reconstruction of the original image is possible, with just as many basis functions as there are pixels in a line of the original image. This means that these decompositions are non-redundant. However within the context of the present invention exact reconstruction is not a strict requirement, since the weighting coefficients obtained from decomposition will be modified anyhow.

If applying the singular value decomposition technique to the matrix H as described above yields one or more zero, or nearly zero singular values, then this means that the selected basis functions which make up the matrix H, are not independent.

In that case the very large or infinite diagonal elements of the matrix D that correspond to zero or nearly zero singular values, are explicitly set to zero. The corresponding row and column in the weighting coefficient matrix will then consist of all zeroes.

The reconstruction is then accomplished by successive matrix multiplication: cfr. formula (5), where the weighting coefficient matrix W' is obtained from W by dropping all zero columns and zero rows, and H' is obtained by dropping the corresponding columns in H.

When the reconstruction is executed without modifying the detail weight coefficient matrix W' then a least square approximation of the original image 2 will result. When at the other hand the detail weight coefficients are modified before reconstruction according to the findings of the present invention, then a contrast enhanced image will result.

A family of non-orthogonal basis functions which perform well in representing local detail at multiple resolution scales, according to a further preferred embodiment of the present invention, are the pyramidal Gabor functions: cfr. formula (6).

According to our preferred embodiment the value N in the above formulas is chosen equal to the column or row size of the original image, which are preferably one less than a power of two: cfr. formula (7).

The number of resolution levels is then equal to p:

$$s=0 \ldots p-1$$

and the total number of basis functions M is then equal to the number given by formula (8).

The decomposition and reconstruction are executed as described above, using the indices i and j, given by formula (9).

All pairwise products of basis functions along horizontal and vertical axes resp. $h_i(k)*h_j(l)$ are considered to be basic detail images in the context of the present invention, except $h_0(k)*h_0(l)$, which is considered to be a basic residual image, having non-zero mean value.

Figure 7:
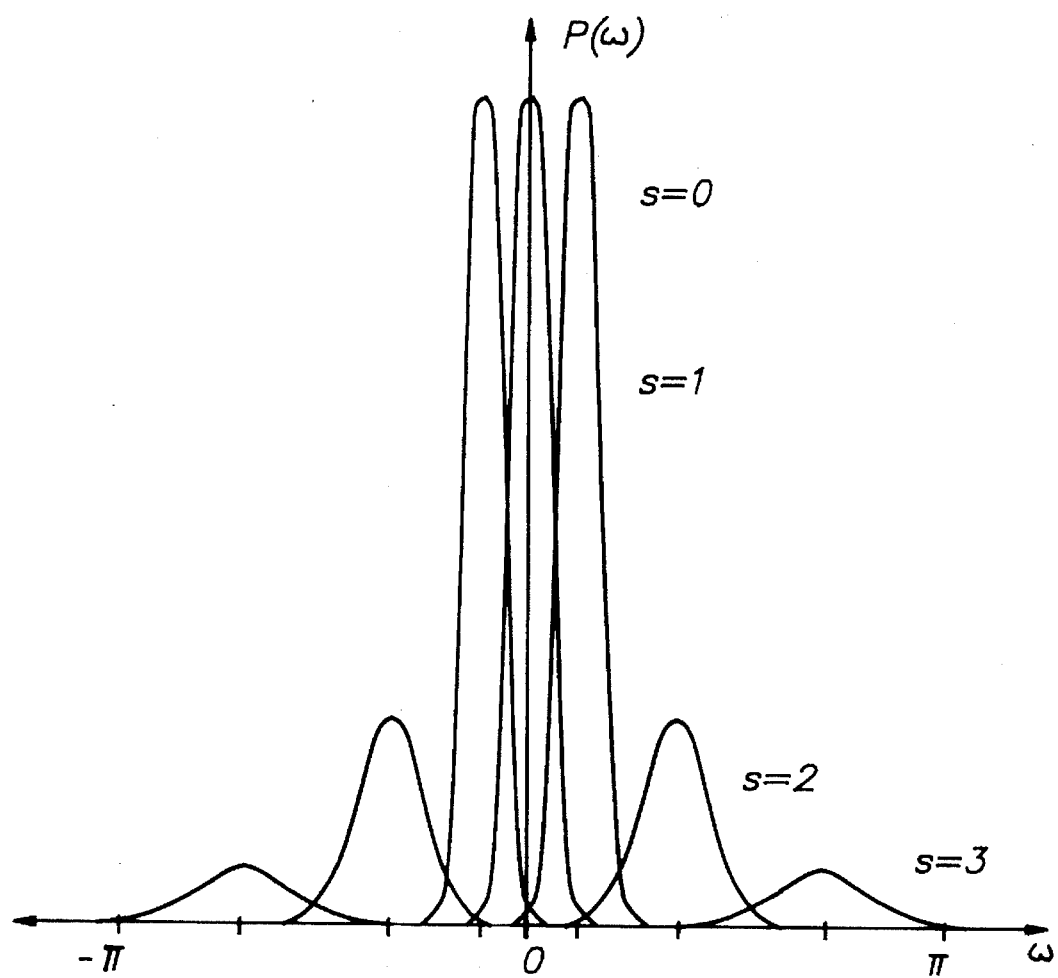
FIG. 7 shows the power spectra of pyramidal Gabor functions.

The gaussian envelope of these functions guarantees a limited spatial extent, which is required in the context of the present invention, and the size of this spatial extent depends on the scale, so that the whole range of resolution levels are covered. FIG. 7 shows the power spectra of these basis functions, which are all displaced gaussian distributions, each covering approximately a different octave of spatial frequency.

Referring to FIG. 3 a preferred embodiment of the modification section 32 in accordance with the findings of the present invention comprises a memory 61 for temporarily storing the detail images 31 and the residual image 31', and a lookup table 62 wich converts every pixel value x of each detail image into an output value y according to the function:

$$y=-m*(-x/m)^p \text{ if } x<0$$

$$y=m*(x/m)^p \text{ if } x>=0$$

where the power p is chosen within the interval $0<p<1$, preferably within the interval $0.5<p<0.9$. A comparative evaluation of a large number of computed radiography images of thorax and bones by a team of radiologists indicated that p=0.7 is the optimal value in most cases. m specifies the abscissa range: $-m<=x<=m$, e.g. m=4095 if detail pixels are represented by 13 bits signed.

Figure 8:
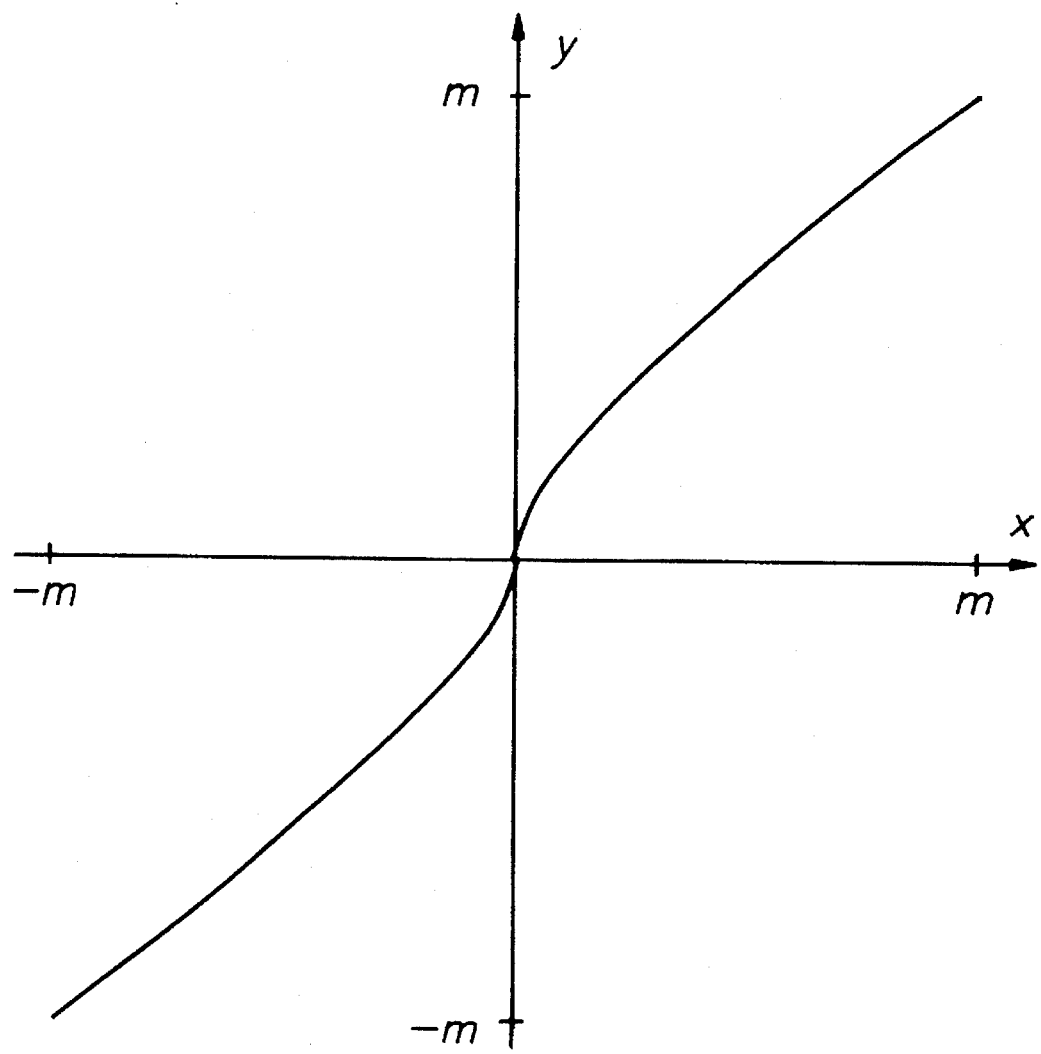
FIG. 8 is a plot of a specific modifying function that can be used in a method of the present invention.

A plot of the above function is presented in FIG. 8.

If depending on the used decomposition method either the pixels of each detail image or otherwise the detail weighting coefficients as obtained from one of the above decomposition methods, are converted according to the above function, then all details with a low amplitude will be boosted relative to the image details wich originally have a good contrast. In this respect the above power function proved to perform very well, but it is clear that an infinite variety of monotonically increasing odd mapping functions can be found that will enhance subtle details. The main requirement is that the slope of said mapping function is steeper in the region of argument values that correspond to small detail image pixel values or coefficient values than it is in the region of large detail pixel or coefficient values.

In an alternative embodiment excessive noise amplification can be avoided by using a composite mapping function:

$$y=-m*(-x/m)^{p_2} \text{ if } -m<=x<-c$$

$$y=-m*(c/m)^{p_2}*(-x/c)^{p_1} \text{ if } -c<=x<0$$

$$y=m*(c/m)^{p_2}*(x/c)^{p_1} \text{ if } 0<=x<c$$

$$y=m*(x/m)^{p_2} \text{ if } c<=x<=m$$

where the power $p_2$ is chosen within the interval $0<p_2<1$, preferably $0.5<p_2<0.9$, and most preferably $p_2=0.7$ (however the preferred value of $p_2$ depends upon the kind of radiological examination), where the power $p_1$ is not smaller than $p_2$: $p_1 >= p_2$, where the cross-over abscissa c specifies the transition point between both power functions: $0<c<m$, and preferably c is very small relative to m; and where m specifies the abscissa range: $-m<=x<=m$.

Figure 9:
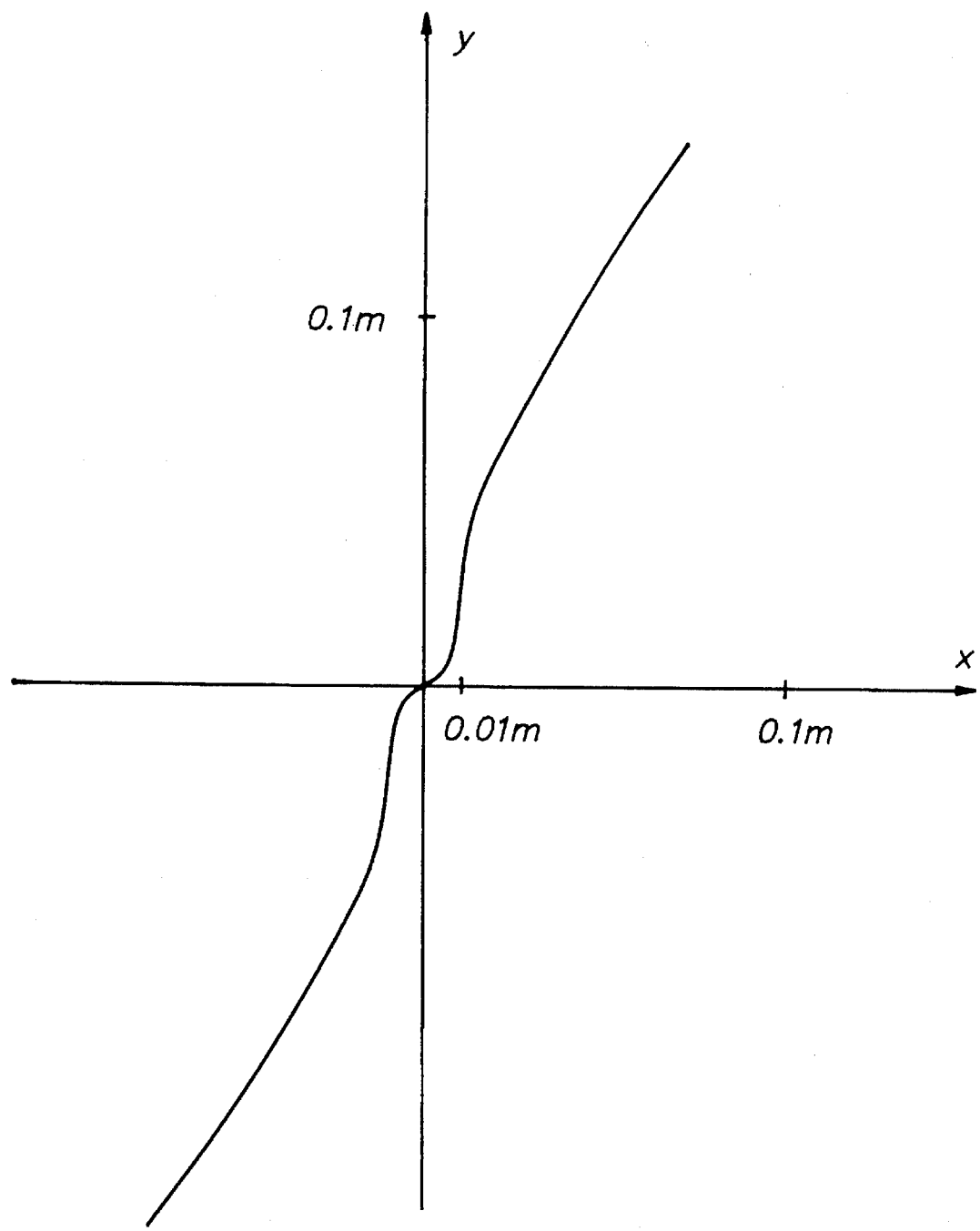
FIG. 9 is a plot of an alternative modifying function.

A plot of the above function is presented in FIG. 9. Decreasing the power $p_2$ will further enhance the contrast of subtle details, but at the same time the noise component will also be amplified. The noise amplification can be limited by choosing a power value $p_1$ larger than $p_2$, preferably 1.0, so that the slope of the mapping function is not extremely steep for the range of very small abscissae in the interval $-c \ldots c$.

Ideally the cross-over abscissa c should be proportional to the standard deviation of the noise component (assuming additive noise), with a proportionality factor preferably between one and two.

In that case the lowest amplitude details burried within the noise along with the majority of the noise signals will only be moderately amplified, according to the slope of the functional part controlled by the power $p_1$, while the detail signals just exceeding the noise level will be amplified much more according to the slope of the functional part controlled by the power $p_2$. The decreasing slope of the latter functional part still assures that the subtle details above the noise level are boosted relative to the high amplitude details.

In this respect the above composite power function proved to perform very well, but it is clear that an infinite variety of monotonically increasing odd mapping functions can be found that will enhance subtle details without boosting the noise to an excessive level. The main requirement is that the slope of said mapping function is steeper in the subrange of argument values that correspond to small detail image pixel values or coefficient values than it is either in the subrange of very small detail pixel or coefficient values which mostly correspond to noise, or in the range of the larger detail values.

When all detail images of the decomposition are modified using the same mapping according to one of the above methods, a uniform enhancement over all scales will result. In a slightly modified embodiment, where a different mapping function is used at each resolution level e.g. by multiplying one of the above described mapping functions with a resolution level-dependent coefficient, it is possible to increase the sharpness by setting the coefficient corresponding to the finest resolution level to a substantially higher value than the other coefficients:

$y = A_i * F(x), i = 0 \ldots L-1,$ where F(x) is one of the above described mappings, L is the number of resolution levels, and $A_i$ is a level dependent coefficient, e.g. $A_0 > 1$, and $A_i = 1$ for $1 <= i <= L-1$.

The detail images are modified starting from the lowest resolution detail image up to the finest level, which is the order in which they are needed in the course of the reconstruction process.

When the detail images are modified according to one of the above methods, and next accumulated in the previously described reconstruction section according to one of the above reconstruction methods, then the dynamic range of the resulting signal will normally exceed the original range. Therefore the resulting image signal is ultimately reduced to the dynamic range of the original image signal, or even smaller. In the former case the contrast of subtle details will show improved perceptibility in comparison with the original image, in the latter case the same perceptiblity level may be reached with a smaller dynamic range, in accordance with the findings of the present invention. In a preferred embodiment the above reduction of dynamic range is accomplished by means of a lookup table, which maps said reconstructed image signal to an output signal which represents the desired screen brightness or film density. The mapping is monotonic and may be linear or curved, depending on the desired gradation.

Figure 10A:
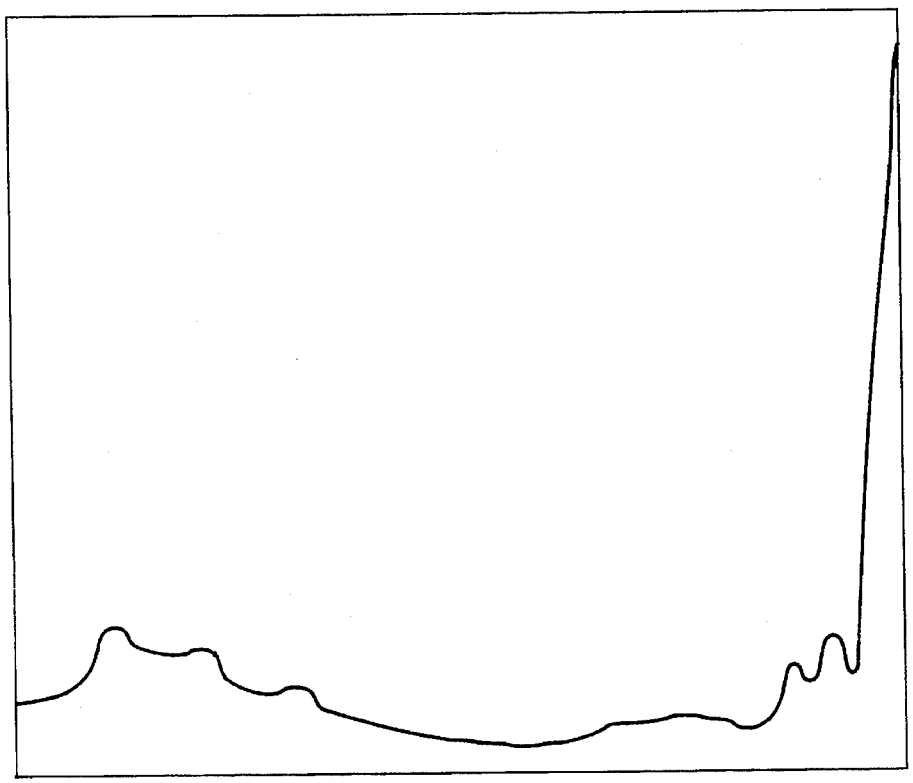
FIG. 10a is a plot of one line of an example original image.
Figure 10B:
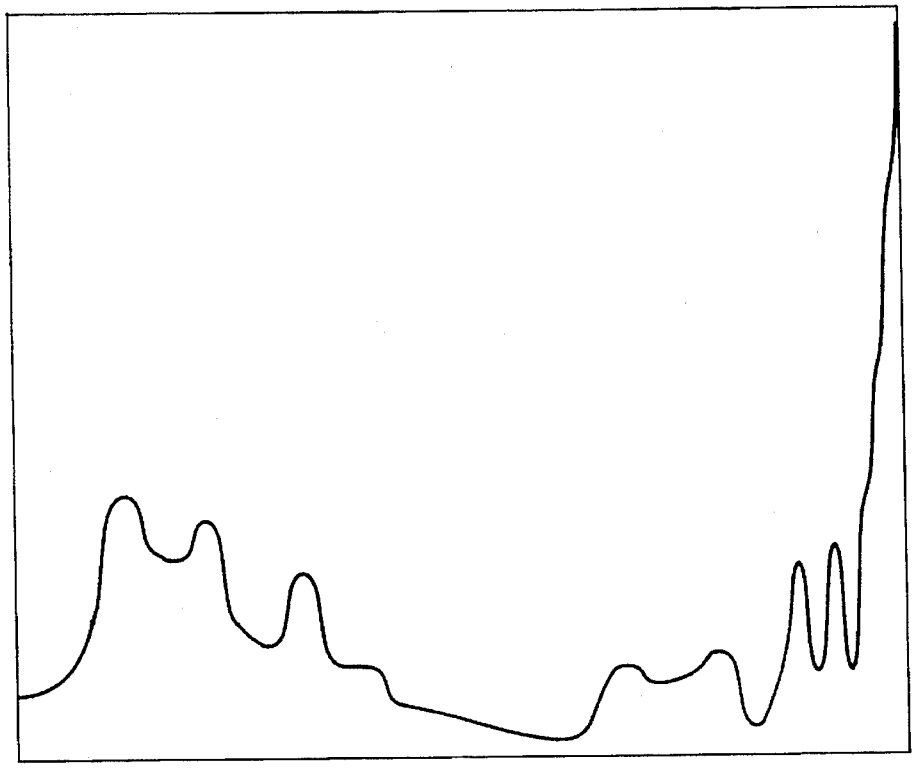
FIG. 10b is a plot of the corresponding line of a contrast enhanced image.

As an example FIG. 10a depicts a single line of an original image 2, and FIG. 10b. the corresponding line of a resulting image 4 enhanced according to the first embodiment of decomposition and reconstruction, and the first embodiment of detail modification. Apparently subtle details have been boosted relative to signal variations of high amplitude, without increasing the overall dynamic range, and without creating overshoots or other artifacts in the vicinity of steep edges (such as the one near the right image border), in accordance with the findings of the present invention.

Formulas $$f(k,l) = \sum_{j=0}^{M-1} \sum_{i=0}^{M-1} w(i,j) h_i(k) h_j(l) \qquad (1)$$

where f(k,l) is the original image, $h_i(k)$ and $h_j(l)$ are one-dimensional basis functions along each of the image coordinate axes respectively, and w(i,j) are the weighting coefficients.

(2) $h_i(k) \, h_j(l)$ (3) $W = VDU^T \, F \, UDV^T$ $$\text{where } W = \begin{bmatrix} w(0,0) \ldots w(0,M-1) \\ . \\ . \\ . \\ w(M-1,0) \ldots w(M-1,M-1) \end{bmatrix}$$

is the resulting weighting coefficient matrix $$\text{and } F = \begin{bmatrix} f(0,0) f(0,1) \ldots f(0,N-1) \\ . \\ . \\ . \\ f(N-1,0) f(N-1,1) \ldots f(N-1,N-1) \end{bmatrix}$$

is the matrix representation of the original image consisting of N×N pixels, $$\text{and } D = \begin{bmatrix} 1/\lambda_0 & 0 & \ldots & 0 \\ 0 & 1/\lambda_1 & \ldots & 0 \\ . & & & \\ . & & & \\ . & & & \\ 0 & . & \ldots & 1/\lambda_{M-1} \end{bmatrix}$$

and where U, V and D are obtained by singular value decomposition of the matrix $$H = \begin{bmatrix} h_0(0) \ldots h_{M-1}(0) \\ \cdot \\ \cdot \\ \cdot \\ h_0(N-1) \ldots h_{M-1}(N-1) \end{bmatrix}$$

in which every column vector represents the samples of one of the basis functions, such that $$H = U \begin{bmatrix} \lambda_0 & 0 & \ldots & 0 \\ 0 & \lambda_1 & & \\ & \cdot & & \\ & & \cdot & \\ 0 & & & \lambda_{M-1} \end{bmatrix} V^T$$

where the columns of U are the normalised eigenvectors of $HH^T$, where the rows of V are the eigenvectors of $H^T H$, and $\lambda_i$ are the singular values of H in descending order. The diagonal matrix D consists of the inverse singular values $1/\lambda_i$.

(4) $F = HWH^T$
(5) $F = H'W'H'^T$ $$h_{0,0}(k) = g_N(k) \quad (6)$$

$$h_{0,1}(k) = g_N(k) \exp\left( j \frac{2\pi}{N} k \right)$$

$$h_{m,s}(k) = g_{N/Ms}\left( k - m \frac{N}{M_s} \exp\left( j \frac{\pi}{N} (3M_s - 1)k \right) \right)$$

where $h_{0,0}$ represents the (single) Gabor function at the coarsest resolution level, where $h_{m,s}$ represent the Gabor function at the resolution level s; $m = 0 \ldots M_s - 1$ where $g_n(k)$ is the zero-mean gaussian distribution function with standard deviation N $$g_N(k) = \exp(-\Pi(k/N)^2)$$

where $j = -1$ where $M_s$ is the number of Gabor functions at every resolution level s $M_s = 1$ if $s = 0$ $M_s = 2^{s-1}$ if $s = 0$ (7) $N = 2^p - 1$
(8) $M = M_0 + M_1 + \ldots M_{p-1} = 2^p = N + 1$
(9) $i = 0 \; s = 0 \; i = 2^{s-1} + m \; s \neq 0 \; i = 0 \ldots M - 1$ and the same for j (j being an index)

What is claimed is:

1. An apparatus for generating an enhanced visual image from an electronic representation of an original image, said apparatus comprising:

decomposing means for decomposing said electronic representation into a sequence of detail images at multiple resolution levels and a residual image at a resolution level lower than the minimum of said multiple resolution levels, said decomposing means comprising:

means for computing approximation images at different resolution levels, adding means and interpolation means for subtracting the approximation image at a current level from the approximation image at a next coarser level after both images are brought into register, and means for iterating the above computations starting with the original image;

modifying means for modifying the pixel values of said detail images by means of at least one non-linear monotonically increasing odd conversion function with a slope that gradually decreases with increasing absolute argument values, computing means for computing a processed image representation by applying a reconstruction algorithm to the residual and the modified detail images, said reconstruction algorithm being such that if it were applied to the residual image and the detail images without modification then the original image or a close approximation thereof would be obtained, said computing means comprising:

adding means and interpolation means for adding the detail image at a resolution level to the approximation level at a coarser resolution level, said images being brought into register, and means for iterating the above additions and interpolating starting with the residual image and the coarsest detail image; and, means for forming the enhanced visual image using the processed image representation to control the generation of density values that constitute the enhanced visual image.

2. Apparatus according to claim 1 further comprising means for reading out a radiation image stored in a photostimulable phosphor screen by scanning said screen with stimulating radiation, detecting the light emitted upon stimulation and converting the detected light into the electronic representation.

3. The apparatus of claim 1 wherein the enhanced visual image is formed as a hard copy.

4. The apparatus of claim 1 wherein the enhanced visual image is formed as a soft copy on a display.

5. Apparatus according to claim 1 wherein said means for computing an approximation image comprise a low pass filter to which the approximation image at a given resolution level is fed starting with the original image and subsampling means for subsampling the result of the filtering operation in proportion to the reduction in spatial frequency bandwidth of the filters.

6. Apparatus according to claim 5 wherein said subsampling means are characterised by a subsampling factor equal to 2 and wherein said low-pass filter has a two-dimensional gaussian distribution.

\* \* \* \* \*